United States Patent
Bhardwaj et al.

(10) Patent No.: US 10,862,743 B2
(45) Date of Patent: Dec. 8, 2020

(54) SYSTEMS AND METHODS TO DETECT, LOCATE, AND SWITCH BASED ON SIGNAL DEGRADE ON MULTI-SEGMENT PSEUDOWIRES

(71) Applicant: Ciena Corporation, Hanover, MD (US)

(72) Inventors: Jayant Kumar Bhardwaj, New Delhi (IN); Pawan Sharma, Hapur (IN); Sagar Sikri, New Delhi (IN)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 16/398,605

(22) Filed: Apr. 30, 2019

(65) Prior Publication Data

US 2020/0304365 A1 Sep. 24, 2020

(30) Foreign Application Priority Data

Mar. 18, 2019 (IN) .............................. 201911010475

(51) Int. Cl.
*H04L 12/24* (2006.01)
*H04L 12/933* (2013.01)
(Continued)

(52) U.S. Cl.
CPC ...... *H04L 41/0686* (2013.01); *H04L 41/0668* (2013.01); *H04L 43/065* (2013.01);
(Continued)

(58) Field of Classification Search
CPC ... H04L 1/22; H04L 12/5602; H04L 41/0654; H04L 41/0659; H04L 41/0668;
(Continued)

(56) References Cited

U.S. PATENT DOCUMENTS 7,746,769 B2 * 6/2010 Shao ...................... H04L 43/045
370/228
7,782,847 B2 * 8/2010 Hua .................... H04L 43/0811
370/389

(Continued)

OTHER PUBLICATIONS

Martini et al, Pseudowire Setup and Maintenance Using the Label Distribution Protocol (LDP), RFC 4447, 33 pages, Apr. 2006.*

(Continued)

*Primary Examiner* — Frank Duong
(74) *Attorney, Agent, or Firm* — Clements Bernard Walker; Lawrence A. Baratta, Jr.; Christopher L. Bernard

(57) ABSTRACT

A node includes a plurality of ports configured to provide a service over a primary Multi-Segment Pseudowire (MS-PW) and a backup MS-PW in a network; a switching fabric interconnecting the plurality of ports; and a controller communicatively coupled to the plurality of ports and the switching fabric, wherein the controller is configured to receive a pseudowire status message for each of the primary MS-PW and the backup MS-PW, determine a Signal Degrade condition on one of the primary MS-PW and the backup MS-PW based on the pseudowire status message, and cause a switch of the service to an inactive one of the primary MS-PW and the backup MS-PW based on a Signal Degrade condition on an active one of the primary MS-PW and the backup MS-PW. The controller can further provide a trap to a management system based on the determined Signal Degrade condition.

20 Claims, 8 Drawing Sheets

(51) Int. Cl.
*H04L 12/781* (2013.01)
*H04L 12/26* (2006.01)
*H04L 12/721* (2013.01)

(52) U.S. Cl.
CPC .............. *H04L 45/52* (2013.01); *H04L 45/68* (2013.01); *H04L 49/15* (2013.01)

(58) Field of Classification Search
CPC ......... H04L 45/28; H04L 47/10; H04L 47/11; H04L 47/12; H04L 47/127; H04L 47/15; H04L 47/2441; H04L 47/27; H04L 47/30; H04L 47/32; H04L 47/35; H04L 47/70; H04L 2012/5627; H04L 2012/5631; H04L 2012/5635
See application file for complete search history.

(56) References Cited

U.S. PATENT DOCUMENTS

| | | | | |
|---|---|---|---|---|
| 8,004,964 B2* | 8/2011 | Boutros | .................. | H04L 45/00 370/219 |
| 8,081,563 B2* | 12/2011 | Guichard | ................ | H04L 45/68 370/221 |
| 8,130,775 B2* | 3/2012 | Jounay | ................... | H04L 45/10 370/401 |
| 8,351,337 B2* | 1/2013 | Cankaya | ............. | H04L 41/5016 370/225 |
| 8,838,829 B2* | 9/2014 | Martini | .................. | H04L 45/02 709/238 |
| 9,025,437 B2* | 5/2015 | Taylor | ................ | H04L 41/0663 370/216 |
| 9,124,486 B2* | 9/2015 | Ould-Brahim | .......... | H04L 45/04 |
| 9,722,916 B2* | 8/2017 | Sivabalan | ............... | H04L 45/28 |
| 9,749,249 B2* | 8/2017 | Pan | ..................... | H04L 41/0659 |
| 10,015,066 B2 | 7/2018 | Mishra et al. | | |
| 10,193,765 B2 | 1/2019 | Holness et al. | | |
| 10,348,615 B2* | 7/2019 | Xu | .......................... | H04L 45/28 |

OTHER PUBLICATIONS

Muley et al, Pseudowire Preferential Forwarding Status Bit, RFC 6870, 35 pages, Feb. 2013.*

L. Martini et al., Internet Engineering Task Force (IETF), Segmented Pseudowire, Category: Standards Track, ISSN: 2070-1721, Jan. 2011, pp. 1-43.

* cited by examiner

SYSTEMS AND METHODS TO DETECT, LOCATE, AND SWITCH BASED ON SIGNAL DEGRADE ON MULTI-SEGMENT PSEUDOWIRES

FIELD OF THE DISCLOSURE

The present disclosure generally relates to networking. More particularly, the present disclosure relates to systems and methods to detect, locate, and switch based on signal degrade on Multi-Segment Pseudowires.

BACKGROUND OF THE DISCLOSURE

Multi-Segment Pseudowires (MS-PW) are described in RFC 6073, "Segmented Pseudowire," January 2011, the contents of which are incorporated by reference herein. A multi-segment pseudowire is a static or dynamically configured set of two or more contiguous pseudowire (PW) segments that behave and function as a single point-to-point PW. Each end of an MS-PW by definition must terminate on a Terminating Provider Edge (T-PE) where Attachment Circuits (ACs) are bound to a PW forwarder. For example, a Layer 2 Virtual Private Network (L2VPN) is a common deployed service in Multiprotocol Label Switching (MPLS), and the most widely used MPLS solution is MS-PW as a base network configuration. The MS-PW provides both flexibility and scalability for network operators. Conventionally, if there is a network fault on a PW segment in the MS-PW, then a Multi Tenant Unit (MTU) node switches traffic to a backup MS-PW. However, conventionally, there is no support to detect, locate, and take action if some segment(s) is suffering from a Signal Degrade (SD) conditions (which can be common). If there is a Signal Degrade condition happening on any segments, this condition will affect the end-to-end service, but nothing would be done in the MS-PW path. The backup MS-PW may be having fewer SD conditions, but still data would be going on primary MS-PW and suffer due to SD conditions.

BRIEF SUMMARY OF THE DISCLOSURE

In an embodiment, a node includes a plurality of ports configured to provide a service over a primary Multi-Segment Pseudowire (MS-PW) and a backup MS-PW in a network; a switching fabric interconnecting the plurality of ports; and a controller communicatively coupled to the plurality of ports and the switching fabric, wherein the controller is configured to receive a pseudowire status message for each of the primary MS-PW and the backup MS-PW, determine a Signal Degrade condition on one of the primary MS-PW and the backup MS-PW based on the pseudowire status message, and cause a switch of the service to an inactive one of the primary MS-PW and the backup MS-PW based on a Signal Degrade condition on an active one of the primary MS-PW and the backup MS-PW. The controller can be further configured to provide a trap to any of a management system, an orchestrator, and a Software Defined Networking (SDN) controller based on the determined Signal Degrade condition, wherein the trap indicates one or more segments that have the determined Signal Degrade condition. The network can be a Multiprotocol Label Switching (MPLS) network and the service is a Layer 2 Virtual Private Network (L2VPN). The pseudowire status message can be received from associated Switching Provider Edge (SPE) nodes on the primary MS-PW and the backup MS-PW. Each SPE node can be configured to append corresponding Signal Degrade conditions from upstream nodes and to append the Signal Degrade condition on its link and forward to downstream nodes towards the node. The pseudowire status message can include a Switching Point Provider Edge (SP-PE) Type-Length-Value (TLV) field with a sub-TLV for conveying the Signal Degrade condition. The sub-TLV for conveying the Signal Degrade condition can be a type defined for vendor-specific implementation.

In another embodiment, a method includes, in a node with i) a plurality of ports configured to provide a service over a primary Multi-Segment Pseudowire (MS-PW) and a backup MS-PW in a network and ii) a switching fabric interconnecting the plurality of ports, receiving a pseudowire status message for each of the primary MS-PW and the backup MS-PW; determining a Signal Degrade condition on either of the primary MS-PW and the backup MS-PW based on the pseudowire status message; and causing a switch of the service to an inactive one of the primary MS-PW and the backup MS-PW based on a Signal Degrade condition on an active one of the primary MS-PW and the backup MS-PW. The method can further include providing a trap to any of a management system, an orchestrator, and a Software Defined Networking (SDN) controller based on the determined Signal Degrade condition, wherein the trap indicates one or more specific segments that have the determined Signal Degrade condition. The network can be a Multiprotocol Label Switching (MPLS) network and the service is a Layer 2 Virtual Private Network (L2VPN). The pseudowire status message can be received from associated Switching Provider Edge (SPE) nodes on the primary MS-PW and the backup MS-PW. Each SPE node can be configured to append corresponding Signal Degrade conditions from upstream nodes and to append the Signal Degrade condition on its link and forward to downstream nodes towards the node. The pseudowire status message can include a Switching Point Provider Edge (SP-PE) Type-Length-Value (TLV) field with a sub-TLV for conveying the Signal Degrade condition. The sub-TLV for conveying the Signal Degrade condition can be a type defined for vendor-specific implementation.

In a further embodiment, a non-transitory computer-readable medium includes instructions that, when executed, cause a node with i) a plurality of ports configured to provide a service over a primary Multi-Segment Pseudowire (MS-PW) and a backup MS-PW in a network and ii) a switching fabric interconnecting the plurality of ports, to perform the steps of, responsive to receiving a pseudowire status message for each of the primary MS-PW and the backup MS-PW, determining a Signal Degrade condition on one of the primary MS-PW and the backup MS-PW based on the pseudowire status message; and causing a switch of the service to an inactive one of the primary MS-PW and the backup MS-PW based on a Signal Degrade condition on an active one of the primary MS-PW and the backup MS-PW. The instructions that, when executed, can further cause the node to perform the step of providing a trap to any of a management system, an orchestrator, and a Software Defined Networking (SDN) controller based on the determined Signal Degrade condition, wherein the trap indicates one or more segments that have the determined Signal Degrade condition. The network can be a Multiprotocol Label Switching (MPLS) network and the service is a Layer 2 Virtual Private Network (L2VPN). The pseudowire status message can be received from associated Switching Provider Edge (SPE) nodes on the primary MS-PW and the backup MS-PW. Each SPE node can be configured to append corresponding Signal Degrade conditions from upstream nodes and to append the Signal Degrade condition on its link and forward to downstream nodes towards the node. The pseudowire status message can include a Switching Point Provider Edge (SP-PE) Type-Length-Value (TLV) field with a sub-TLV for conveying the Signal Degrade condition.

BRIEF DESCRIPTION OF THE DRAWINGS

The present disclosure is illustrated and described herein with reference to the various drawings, in which like reference numbers are used to denote like system components/method steps, as appropriate, and in which:

FIG. 8 is a block diagram of a server which may be used for a Network Management System (NMS) or the like.

DETAILED DESCRIPTION OF THE DISCLOSURE

The present disclosure relates to systems and methods to detect, locate, and switch based on signal degrade on Multi-Segment Pseudowires (MS-PW). The present disclosure enables communication of Signal Degrade (SD) conditions on segments in the network and corresponding service level switchover based thereon, to provide better service to end customers. Also, the present disclosure enables a network operator to locate a specific segment(s) having SD conditions enabling fault localization and remediation. This information about the specific Switching Provider Edge (SPE) node having SD condition can be informed by an MTU node to a management system as a trap and notifications can be seen in management system with details of the exact segments (SPEs) having SD condition. Advantageously, the systems and methods enable smart switchover of service carrying pseudowires on the basis of SD conditions in MS-PW segments. Also, the systems and methods enhance network capability to provide network level analysis and debug information.

As described herein, an SD condition degrades the end-to-end service but is not detected as a fault (loss of service). The SD condition is where a packet network connection is operational, but experiencing errors determined on the packet network connection at a packet layer below a threshold. The errors can be detected based on a Frame Error Rate (FER), Bit Error Rate (BER), delay measurement, loss measurement, combinations thereof, and the like. An example of the SD condition is described in commonly-assigned U.S. patent application Ser. No. 16/214,285, filed Dec. 10, 2018, and entitled "Protection switching systems and methods in a packet network based on signal degrade," the contents of which are incorporated by reference herein.

Figure 1:
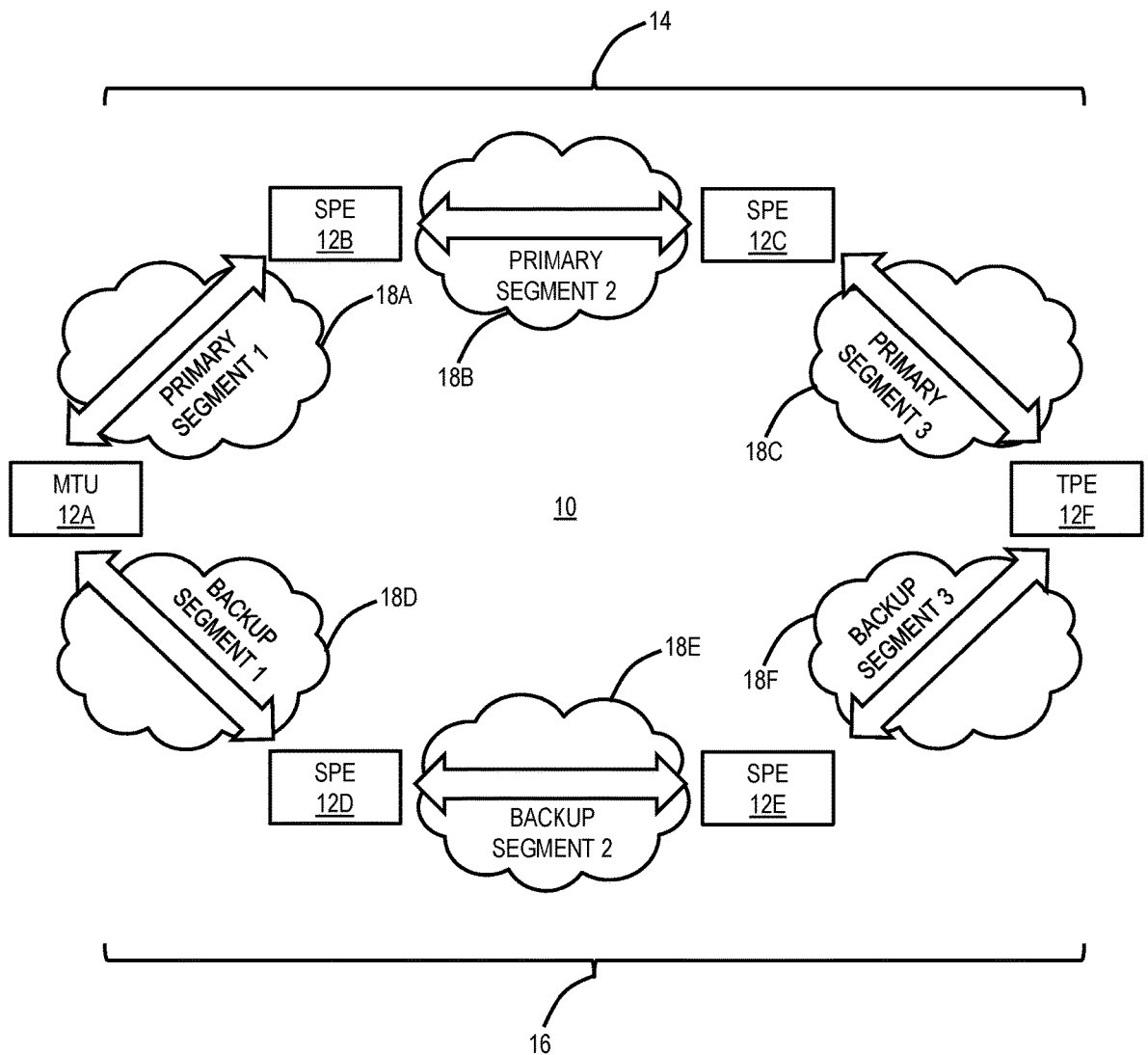
FIG. 1 is a network diagram of an MPLS network for illustrating the systems and methods.

FIG. 1 is a network diagram of an MPLS network 10 for illustrating the systems and methods. The MPLS network 10 includes a Multi Tenant Unit (MTU) node 12A connected to a Terminating Provider Edge (TPE) node 12F. The node 12A has a primary MS-PW 14 and a backup MS-PW 16. The MPLS network 10 also includes various Switching Provider Edge (SPE) nodes 12B, 12C, 12D, 12E. There can also be multiple nodes between each SPE node 12B, 12C, 12D, 12E which are illustrated as an MPLS network cloud 18A, 18B, 18C, 18D, 18E, 18F. The primary MS-PW 14 is between the MTU node 12A, the SPE nodes 12B, 12C, and the TPE node 12F. The backup MS-PW 16 is between the MTU node 12A, the SPE nodes 12D, 12E, and the TPE node 12F. For illustration purposes, the primary MS-PW 14 includes three segments, denoted as primary segment 1, 2, 3, and the backup MS-PW 16 also includes three segments, denoted as backup segment 1, 2, 3. Of course, other configurations and numbers of segments are contemplated. In each MS-PW 14, 16, each PW segment is an independent pseudowire created over an MPLS tunnel between two end nodes 12A, 12B, 12C, 12D, 12E, 12F. At switching nodes 12B, 12C, 12D, 12E (SPE), two pseudowire Segments are stitched, and the end-to-end service is mapped on the nodes 12A, 12F on the overall MS-PW 14, 16. As described, herein the end-to-end service can be an L2VPN.

Assume the end-to-end service is operational on the primary MS-PW 14. Conventionally, if there is a network fault on any of the primary segments 1, 2, 3, the MTU node 12A switches the end-to-end service to the backup MS-PW 16. Again, there is no conventional support to detect, locate, and take action if any segment(s) is suffering from Signal Degrade (SD) conditions.

The present disclosure provides a solution where the MTU node 12A can know the recent SD condition on each segment of the MS-PWs 14, 16, locate any problematic segment, and can take action to switchover between the MS-PWs 14, 16 if SD conditions breach a threshold. The threshold may be provided as operator configurable option.

Figure 2:
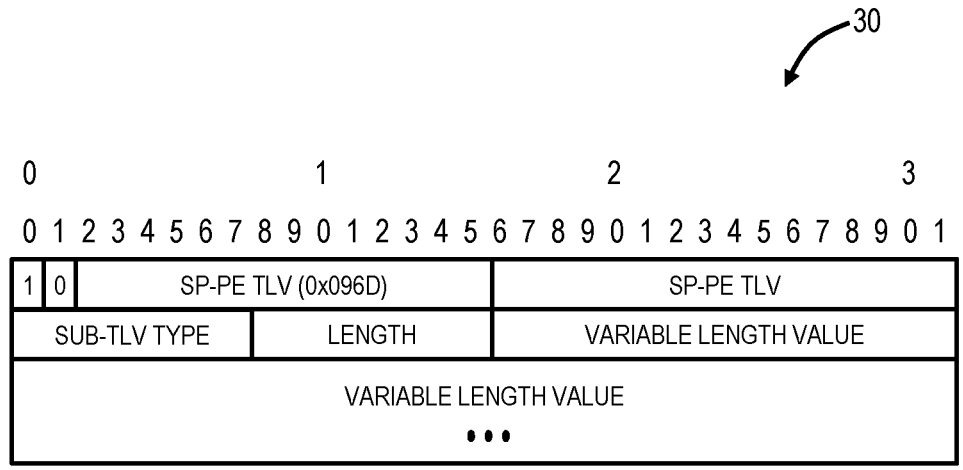
FIG. 2 is a diagram of a Switching Point Provider Edge (SP-PE) Type-Length-Value (TLV) and a sub-TLV for inclusion therein to signal SD conditions.
Figure 2:
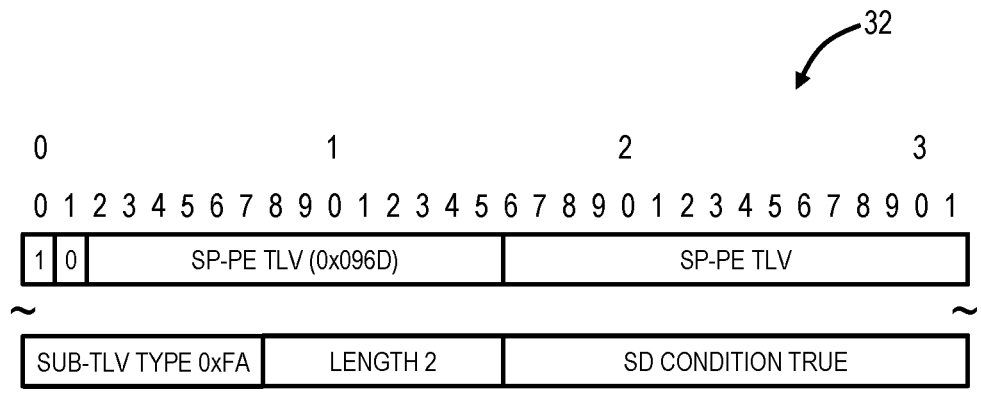

FIG. 2 is a diagram of a Switching Point Provider Edge (SP-PE) Type-Length-Value (TLV) 30 and a sub-TLV 32 for inclusion therein to signal SD conditions.

Specifically, the systems and methods utilize the SP-PE TLV 30 in a pseudowire status message. The pseudowire status messages are periodic messages which are exchanged between pseudowire endpoints specifying pseudowire status. The SP-PE TLV 30 is defined in RFC 6073 (previously incorporated) to provide pseudowire segment level information. The SP-PE TLV 30 is identified as SP-PE TLV (0x096D) and includes an SP-PE TLV length specifying the total length of all following TLV fields.

The present disclosure proposes the sub-TLV 32 to convey SD condition for an SPE node 12B, 12C, 12D, 12E. For example, the new sub-TLV 32 can use type 0xFA for providing the SD information about the pseudowire. Of course, other undefined types could be used instead of 0xFA. At each switching point, the SPE node 12B, 12C, 12D, 12E can generate and append the sub-TLV 32 to its SP-PE TLV 30 with other SP-PE TLVs 30 and their corresponding sub-TLVs 32 received from in status messages and send the status message to its other peer. This way each segment's SP-PE TLVs 30 are reached at the MTU node 12A. The MTU node 12A can then run a proposed logic to take a decision on the basis of the SD conditions on the primary MS-PW 14 and the backup MS-PW 16.

The MTU node 12A can also send this information to any management system, network analysis tool, orchestrator, Software Defined Networking (SDN) controller, etc. providing the exact segment detail where SD condition is seen.

The Existing Internet Assigned Numbers Authority (IANA) Standard Sub-TLV type are assigned as follows for the SP-PE TLV 30:

| Type | Length | Description |
| --- | --- | --- |
| 0x01 | 4 | Pseudowire ID of last pseudowire segment traversed |
| 0x02 | Variable | Pseudowire Switching Point description string |
| 0x03 | 4/16 | Local Internet Protocol (IP) address of Pseudowire Switching Point |
| 0x04 | 4/16 | Remote IP address of last Pseudowire Switching Point traversed or of the TPE node |
| 0x05 | Variable | Forwarding Equivalence Class (FEC) element of last pseudowire segment traversed |
| 0x06 | 12 | Layer 2 pseudowire address of Pseudowire Switching Point |
| 0xFA | 2 | Pseudowire SD condition |

The range from 0x80 to 0xFE are defined by LANA to be used by Vendors. So, the value 0xFA is proposed as an example.

The SP-PE TLV 30 and the sub-TLV 32 are optional, and a node 12 may process/discard/propagate these the sub-TLV 32 based on local configuration on the node. Accordingly, this does not interfere with co-existence of other vendors' devices which do not support the sub-TLV 32. The devices of other vendors would work and process the status messages as they were doing already.

Figure 3:
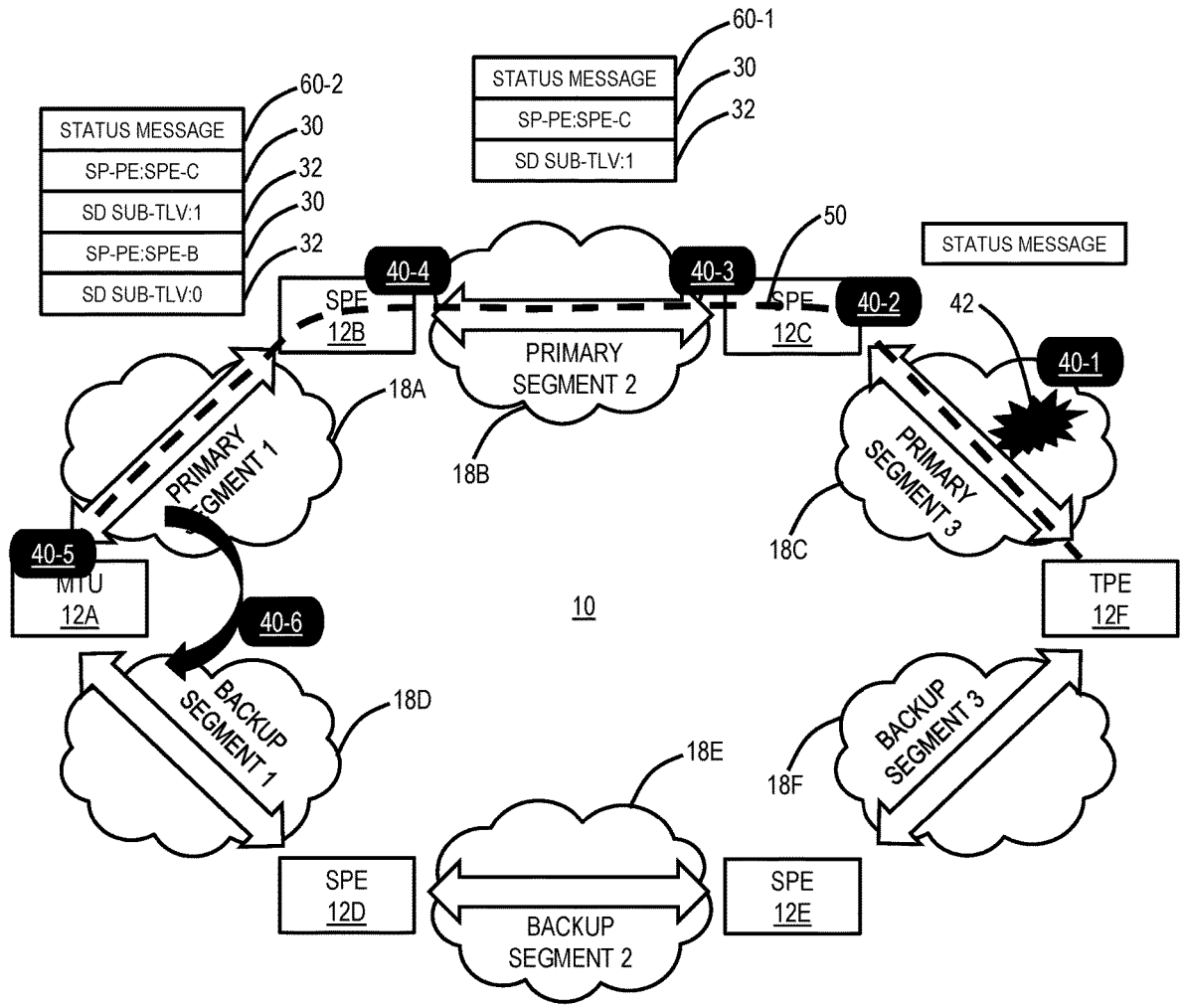
FIG. 3 is a network diagram of the MPLS network of FIG. 1 illustrating a process based on an example SD condition.

FIG. 3 is a network diagram of the MPLS network 10 illustrating a process 40 based on example SD condition 42. Initially, a service 50 is operating between the MTU node 12A and the TPE node 12F on the primary MS-PW 14 over the primary segments 1, 2, 3 and through the SPE nodes 12B, 12C, 12D. At this initial stage, there is no SD condition and each SPE node 12B, 12C, 12D, 12E is sending its SD condition as FALSE in the periodic pseudowire status message SP-PE TLVs 30.

At step 40-1, there is the SD condition 42 in the primary segment 3. At a step 40-2, the SD condition 42 is detected on the primary segment 3 by the underlying Label Switched Path (LSP) at the SPE node 12C. As previously described, there are solutions to detect the SD condition 42 on at an MPLS LSP level and present disclosure assumes support at the SPE nodes 12B, 12C, 12D, 12E. Note, the LSP SD components at the nodes 12 can only do LSP level switchover and have no visibility at layers above the LSP.

At step 40-3, the SPE node 12C sets the SD condition value in the new sub-TLV 32 as TRUE and sends this forward to the peer node 12B in a periodic pseudowire status message 60-1. At step 40-4, the SPE node 12B receives the periodic pseudowire status message 60-1 from the SPE node 12C and appends the SP-PE TLV 30 and the sub-TLV 32 to its periodic pseudowire status message 60-2. The SPE node 12B also includes its SP-PE TLV 30 and sub-TLV 32 in the periodic pseudowire status message 60-2, but these are set to FALSE relative to an SD condition on the primary segment 2.

At step 40-5, the MTU node 12A receives the periodic pseudowire status message 60-2 for the primary MS-PW 14 with the SP-PE TLV 30 of all segments with one segment showing SD condition. At step 40-6, the MTU node 12A determines the primary MS-PW 14 has a poorer SD condition than the backup MS-PW 16 and switches the service 50 to the backup MS-PW 16.

Note, FIG. 3 only shows the periodic pseudowire status messages 60 for the primary MS-PW 14 from the TPE node 12F towards the MTU node 12A. This same flow occurs for the backup MS-PW 16 but is omitted for illustration purposes. In the periodic pseudowire status messages 60, the SD condition is set as 1 (TRUE) set in the SD Sub-TLV of the SPE node 12C. Each SP-PE TLV also has a pseudowire identifier along with a node identifier; those are not shown in here as they are part of existing standards.

Figure 4:
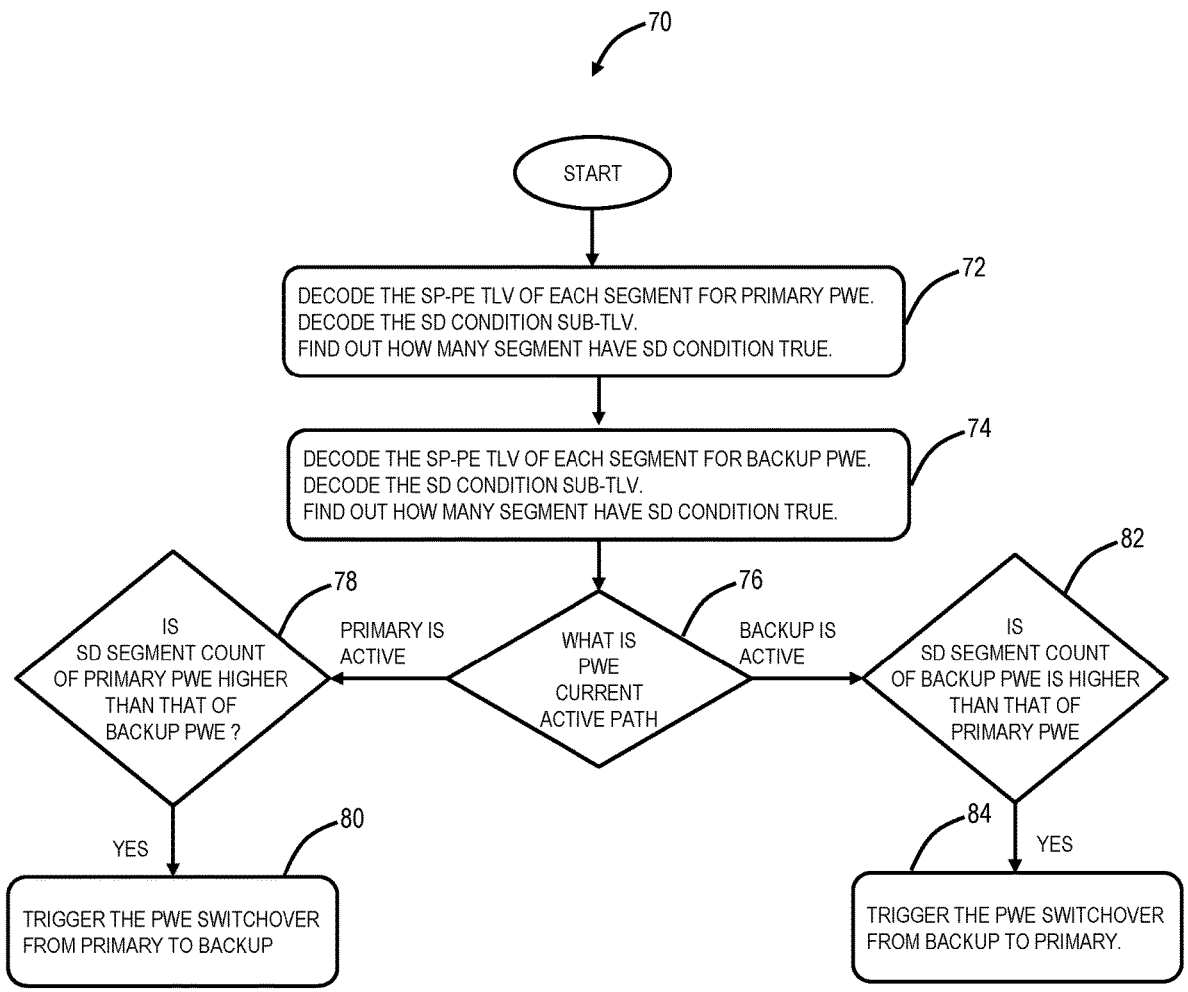
FIG. 4 is a flowchart of a process implemented at the MTU node for switching between the primary MS-PW and the backup MS-PW based on SD conditions.

FIG. 4 is a flowchart of a process 70 implemented at the MTU node 12A for switching between the primary MS-PW 14 and the backup MS-PW 16 based on SD conditions. Specifically, the process 70 can be implemented subsequent to receiving the pseudowire status messages 60 with the SP-PE TLV 30 and the sub-TLV 32 of all segments. The process 70 starts and decodes the SP-PE TLV 30 for each segment of the primary MS-PW 14, decodes the SD condition sub-TLV 32, and determines how many segments have the SD condition TRUE (step 72). The process 70 also decodes the SP-PE TLV 30 for each segment of the backup MS-PW 16, decodes the SD condition sub-TLV 32, and determines how many segments have the SD condition TRUE (step 74).

If the primary MS-PW 14 is active (step 76), the process includes determining if the SD segment count of the primary MS-PW 14 is higher than that of the backup MS-PW 16 (step 78). If so, the process 70 includes triggering a pseudowire switchover from the primary MS-PW 14 to the backup MS-PW 16 (step 80); otherwise, the process 70 ends. If the backup MS-PW 16 is active (step 76), the process includes determining if the SD segment count of the backup MS-PW 16 is higher than that of the primary MS-PW 14 (step 82). If so, the process 70 includes triggering a pseudowire switchover from the backup MS-PW 16 to the primary MS-PW 14 (step 84); otherwise, the process 70 ends.

Figure 5:
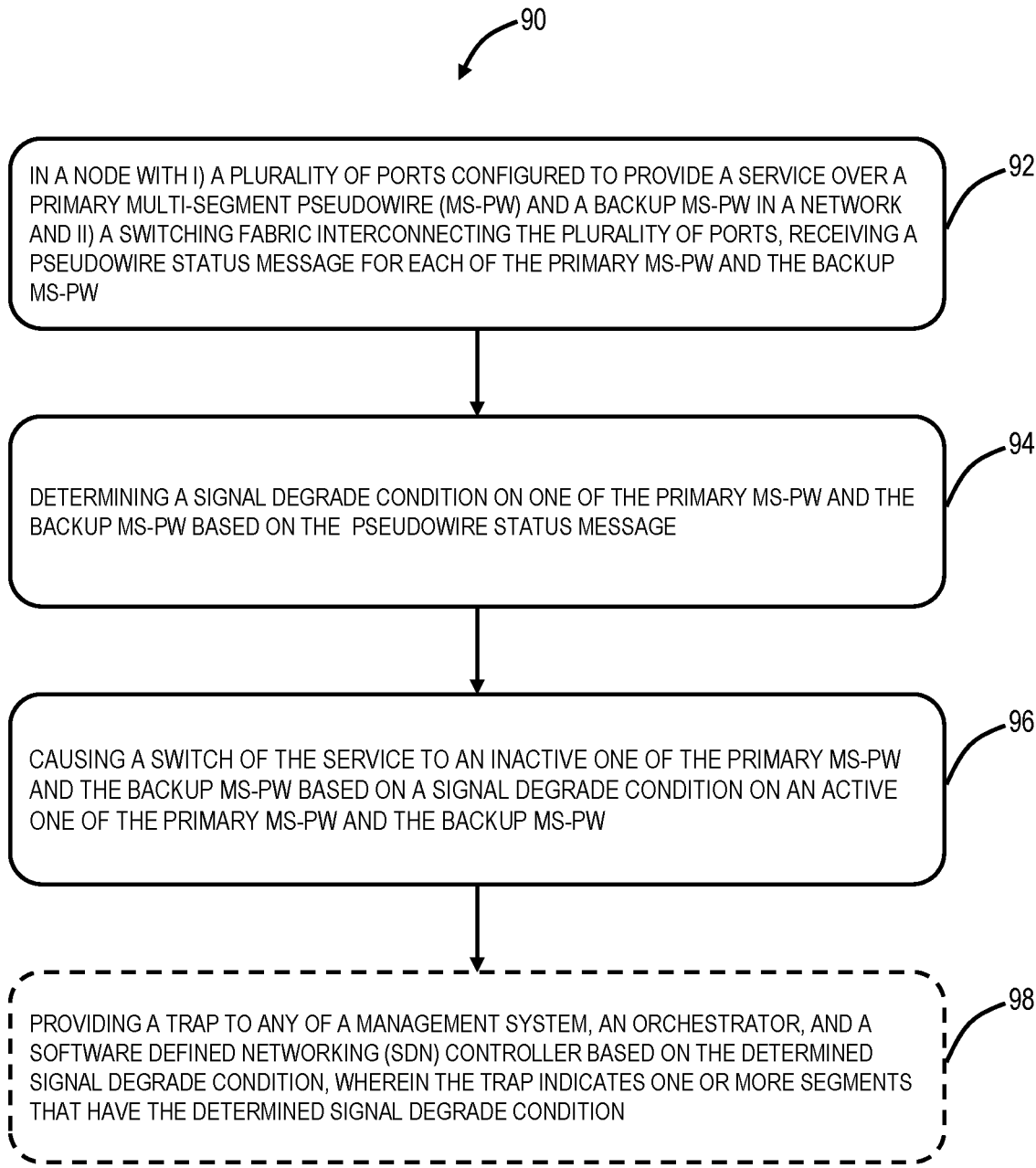
FIG. 5 is a flowchart of a process performed in the MTU node.

FIG. 5 is a flowchart of a process 90 performed in the MTU node 12A. The process 90 includes in a node with i) a plurality of ports configured to provide a service over a primary Multi-Segment Pseudowire (MS-PW) and a backup MS-PW in a network and ii) a switching fabric interconnecting the plurality of ports, receiving a pseudowire status message for each of the primary MS-PW and the backup MS-PW (step 92); determining a Signal Degrade condition on one of the primary MS-PW and the backup MS-PW based on the pseudowire status message (step 94); and causing a switch of the service to an inactive one of the primary MS-PW and the backup MS-PW based on a Signal Degrade condition on an active one of the primary MS-PW and the backup MS-PW (step 96).

The process 90 can include providing a trap to any of a management system, an orchestrator, and a Software Defined Networking (SDN) controller based on the determined Signal Degrade condition, wherein the trap indicates a one or more segments that have the determined Signal Degrade condition (step 98). The network can be the Multiprotocol Label Switching (MPLS) network 10, and the service can be a Layer 2 Virtual Private Network (L2VPN). The pseudowire status message can be received from associated Switching Provider Edge (SPE) nodes on the primary MS-PW and the backup MS-PW.

Each SPE node can be configured to append corresponding Signal Degrade conditions from upstream nodes and to append the Signal Degrade condition on its link and forward to downstream nodes towards the node. The pseudowire status message can include a Switching Point Provider Edge (SP-PE) Type-Length-Value (TLV) field with a sub-TLV for conveying the Signal Degrade condition. The sub-TLV for conveying the Signal Degrade condition can be a type defined for vendor-specific implementation.

Node

Figure 6:
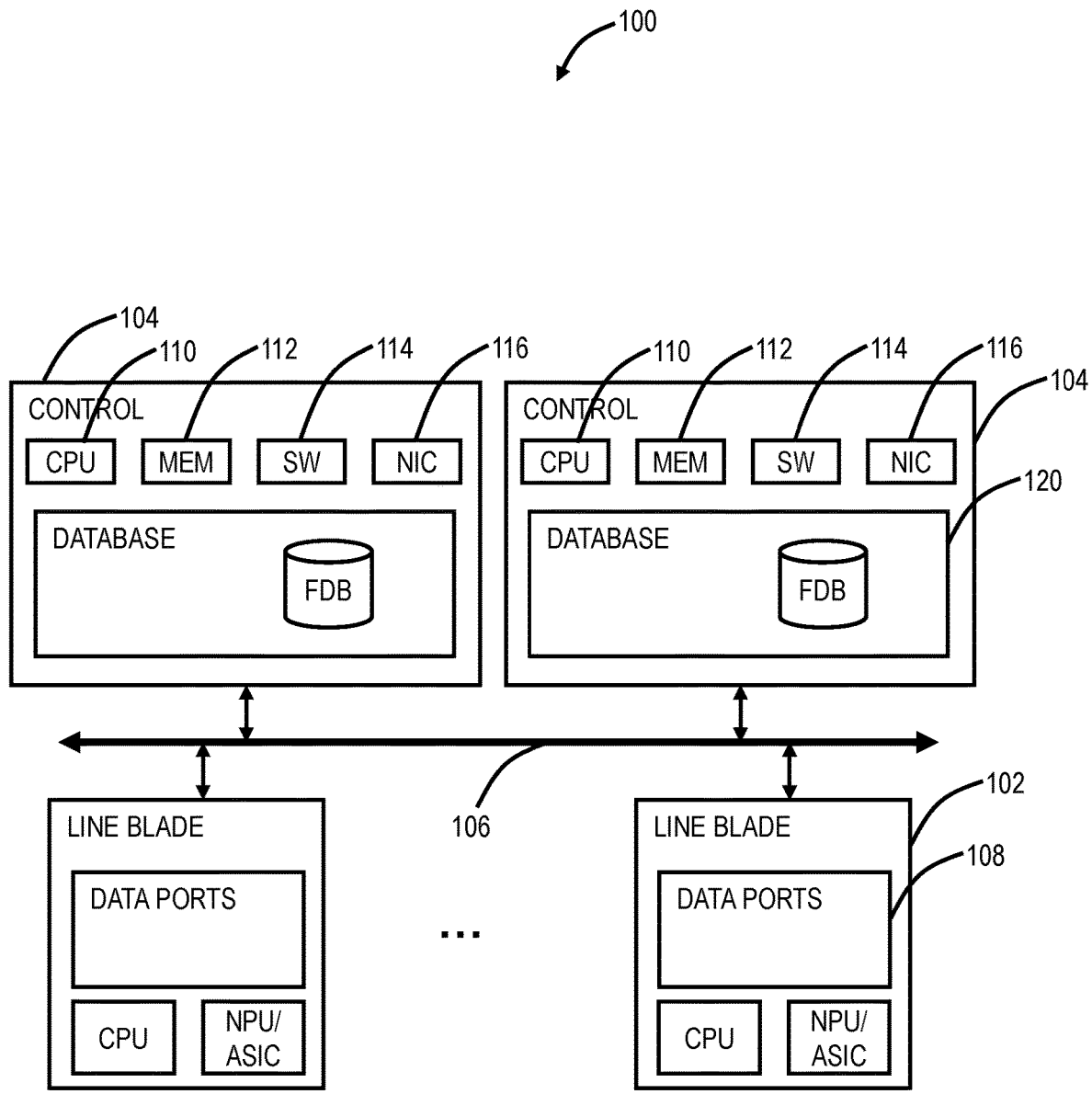
FIG. 6 is a block diagram of an implementation of a node.

FIG. 6 is a block diagram of an implementation of a node 100, such as for the node 12. In this embodiment, the node 100 is an Ethernet network switch, but those of ordinary skill in the art will recognize the systems and methods described herein can operate with other types of network elements and other implementations. In this embodiment, the node 100 includes a plurality of blades 102, 104 interconnected via an interface 106. The blades 102, 104 are also known as line cards, line modules, circuit packs, pluggable modules, etc. and generally refer to components mounted on a chassis, shelf, etc. of a data switching device, i.e., the node 100. Each of the blades 102, 104 can include numerous electronic devices and/or optical devices mounted on a circuit board along with various interconnects including interfaces to the chassis, shelf, etc.

Two example blades are illustrated with line blades 102 and control blades 104. The line blades 102 include data ports 108 such as a plurality of Ethernet ports. For example, the line blade 102 can include a plurality of physical ports disposed on an exterior of the blade 102 for receiving ingress/egress connections. Additionally, the line blades 102 can include switching components to form a switching fabric via the interface 106 between all of the data ports 108 allowing data traffic to be switched between the data ports 108 on the various line blades 102. The switching fabric is a combination of hardware, software, firmware, etc. that moves data coming into the node 100 out by the correct port 108 to the next node 100. "Switching fabric" includes switching units in a node; integrated circuits contained in the switching units; and programming that allows switching paths to be controlled. Note, the switching fabric can be distributed on the blades 102, 104, in a separate blade (not shown), integrated on the line blade 102, or a combination thereof. The line blades 102 can include an Ethernet manager (i.e., a processor) and a Network Processor (NP)/Application Specific Integrated Circuit (ASIC).

The control blades 104 include a microprocessor 110, memory 112, software 114, and a network interface 116. Specifically, the microprocessor 110, the memory 112, and the software 114 can collectively control, configure, provision, monitor, etc. the node 100. The network interface 116 may be utilized to communicate with an element manager, a network management system, etc. Additionally, the control blades 104 can include a database 120 that tracks and maintains provisioning, configuration, operational data and the like. The database 120 can include a forwarding database (FDB) that may be populated as described herein (e.g., via the user triggered approach or the asynchronous approach). In this embodiment, the node 100 includes two control blades 104 which may operate in a redundant or protected configuration such as 1:1, 1+1, etc.

Figure 7:
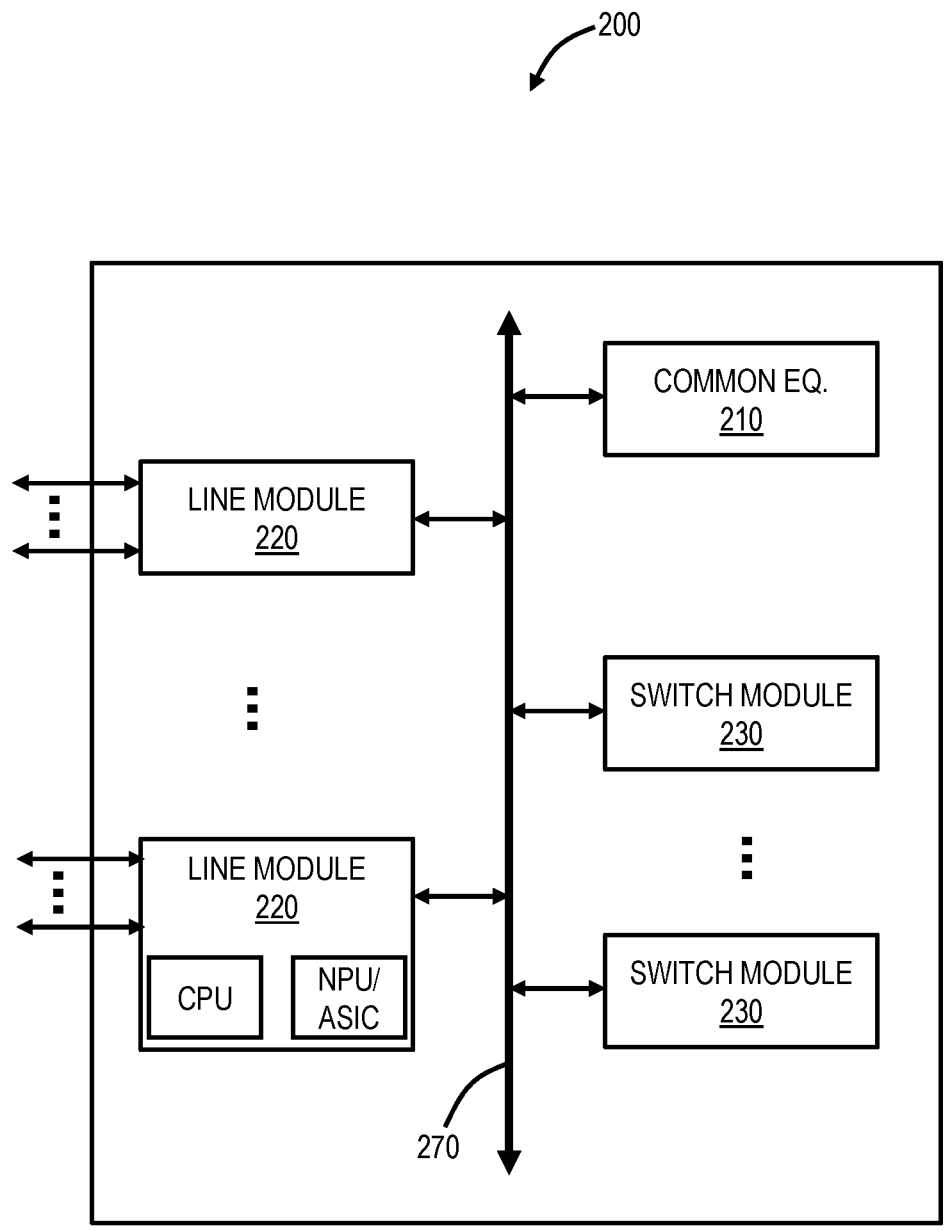
FIG. 7 is a block diagram of another implementation of a node.

FIG. 7 is a block diagram of another implementation of a node 200. For example, the node 100 can be a dedicated switch whereas the node 200 can be a multiservice platform. In an embodiment, the node 200 can be a nodal device that may consolidate the functionality of a multiservice provisioning platform (MSPP), digital cross-connect (DCS), Ethernet and Optical Transport Network (OTN) switch, dense wave division multiplexed (DWDM) platform, etc. into a single, high-capacity intelligent switching system providing Layer 0, 1, and 2 consolidation. In another embodiment, the node 200 can be any of an add/drop multiplexer (ADM), a multiservice provisioning platform (MSPP), a digital cross-connect (DCS), an optical cross-connect, an optical switch, a router, a switch, a WDM terminal, an access/aggregation device, etc. That is, the node 200 can be any system with ingress and egress signals and switching of packets, channels, timeslots, tributary units, wavelengths, etc.

In an embodiment, the node 200 includes common equipment 210, one or more line modules 220, and one or more switch modules 230. The common equipment 210 can include power; a control module; operations, administration, maintenance, and provisioning (OAM&P) access; and the like. The common equipment 210 can connect to a management system such as a network management system (NMS), an element management system (EMS), or the like. The node 200 can include an interface 270 for communicatively coupling the common equipment 210, the line modules 220, and the switch modules 230 together. For example, the interface 270 can be a backplane, midplane, a bus, optical or electrical connectors, or the like. The line modules 220 are configured to provide ingress and egress to the switch modules 230 and external to the node 200. In an embodiment, the line modules 220 can form ingress and egress switches with the switch modules 230 as center stage switches for a three-stage switch.

The line modules 220 can include a plurality of connections per module and each module may include a flexible rate and protocol support for any type of connection, such as, for example, 155 Mb/s, 622 Mb/s, 1 Gb/s, 2.5 Gb/s, 10 Gb/s, 40 Gb/s, 100 Gb/s, etc. The line modules 220 can include wavelength division multiplexing interfaces, short reach interfaces, and the like, and can connect to other line modules 220 on remote network elements, end clients, routers, switches, and the like. From a logical perspective, the line modules 220 provide ingress and egress ports to the node 200, and each line module 220 can include one or more physical ports. The switch modules 230 are configured to switch channels, timeslots, tributary units, wavelengths, etc. between the line modules 220. For example, the switch modules 230 can provide wavelength granularity (Layer 0 switching), SONET/SDH granularity; OTN granularity such as Optical Channel Data Unit-k (ODUk) Optical Channel Data Unit-flex (ODUflex), etc.; Ethernet granularity; and the like. Specifically, the switch modules 230 can include both Time Division Multiplexed (TDM) (i.e., circuit switching) and packet switching engines. The switch modules 230 can include redundancy as well, such as 1:1, 1:N, etc.

In context of the systems and methods described herein, the node 100 includes packet switching and Ethernet ring functionality which can be implemented in circuitry and located on the line blade 102, the control blade 104, in the switching fabric at some point, etc. Similar to the node 100, the node 200 includes packet switching and Ethernet ring functionality through the line modules 220 and/or the switch modules 230. The node 200 includes packet switching and Ethernet ring functionality implemented in circuitry and located on the line modules 220, the switch modules 230, the common equipment 210, etc. Specifically, the node isolation detection process 50 can be implemented in circuitry, logic, hardware, firmware, software, and/or a combination thereof in part in the nodes 100, 200. Those of ordinary skill in the art will recognize the nodes 100, 200 can include other components that are omitted for illustration purposes, and that the systems and methods described herein contemplate using a plurality of different nodes with the nodes 100, 200 presented as an example type of node. For example, in another embodiment, a node may not include the switch modules 230, but rather have the corresponding functionality in the line modules 220 (or some equivalent) in a distributed fashion. In a further embodiment, the node may be an integrated device without a blade, line modules, etc., i.e., a so-called pizza box. For the nodes 100, 200, other architectures providing ingress, egress, and switching are also contemplated for the systems and methods described herein.

In an embodiment, a node includes a plurality of ports configured to provide a service over a primary Multi-Segment Pseudowire (MS-PW) and a backup MS-PW in a network; a switching fabric interconnecting the plurality of ports; and a controller communicatively coupled to the plurality of ports and the switching fabric, wherein the controller is configured to receive a pseudowire status message for each of the primary MS-PW and the backup MS-PW, determine a Signal Degrade condition on either of the primary MS-PW and the backup MS-PW based on the pseudowire status message, and cause a switch of the service to an inactive one of the primary MS-PW and the backup MS-PW based on a Signal Degrade condition on an active one of the primary MS-PW and the backup MS-PW.

Network Management System

Figure 8:
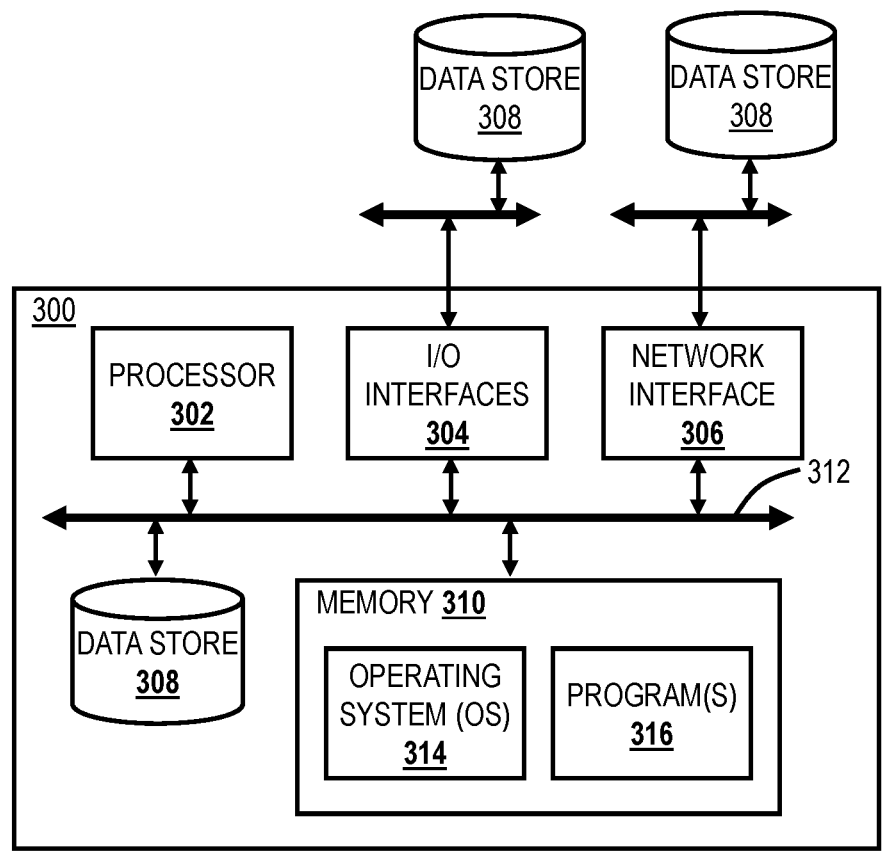

FIG. 8 is a block diagram of a server 300 which may be used for a Network Management System (NMS) or the like. The server 300 may be a digital computer that, in terms of hardware architecture, generally includes a processor 302, input/output (I/O) interfaces 304, a network interface 306, a data store 308, and memory 310. It should be appreciated by those of ordinary skill in the art that FIG. 8 depicts the server 300 in an oversimplified manner, and a practical embodiment may include additional components and suitably configured processing logic to support known or conventional operating features that are not described in detail herein. The components (302, 304, 306, 308, and 310) are communicatively coupled via a local interface 312. The local interface 312 may be, for example, but not limited to, one or more buses or other wired or wireless connections, as is known in the art. The local interface 312 may have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 may be any custom made or commercially available processor, a central processing unit (CPU), an auxiliary processor among several processors associated with the server 300, a semiconductor-based microprocessor (in the form of a microchip or chip set), or generally any device for executing software instructions. When the server 300 is in operation, the processor 302 is configured to execute software stored within the memory 310, to communicate data to and from the memory 310, and to generally control operations of the server 300 pursuant to the software instructions. The I/O interfaces 304 may be used to receive user input from and/or for providing system output to one or more devices or components. User input may be provided via, for example, a keyboard, touchpad, and/or a mouse.

The network interface 306 may be used to enable the server 300 to communicate over a network, and the like, etc. The network interface 306 may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n). The network interface 306 may include address, control, and/or data connections to enable appropriate communications on the network. A data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media. In one example, the data store 308 may be located internal to the server 300 such as, for example, an internal hard drive connected to the local interface 312 in the server 300. Additionally, in another embodiment, the data store 308 may be located external to the server 300 such as, for example, an external hard drive connected to the I/O interfaces 304 (e.g., SCSI or USB connection). In a further embodiment, the data store 308 may be connected to the server 300 through a network, such as, for example, a network attached file server.

The memory 310 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 310 may incorporate electronic, magnetic, optical, and/or other types of storage media. Note that the memory 310 may have a distributed architecture, where various components are situated remotely from one another, but can be accessed by the processor 302. The software in memory 310 may include one or more software programs, each of which includes an ordered listing of executable instructions for implementing logical functions. The software in the memory 310 includes a suitable operating system (O/S) 314 and one or more programs 316. The operating system 314 essentially controls the execution of other computer programs, such as the one or more programs 316, and provides scheduling, input-output control, file and data management, memory management, and communication control and related services. The one or more programs 316 may be configured to implement the various processes, algorithms, methods, techniques, etc. described herein.

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A node comprising:
   a plurality of ports configured to provide a service over a primary Multi-Segment Pseudowire (MS-PW) and a backup MS-PW in a network;
   a switching fabric interconnecting the plurality of ports; and
   a controller communicatively coupled to the plurality of ports and the switching fabric, wherein the controller is configured to
      receive a first pseudowire status message associated with the primary MS-PW,
      receive a second pseudowire status message associated with the backup MS-PW,
      determine a Signal Degrade condition on one of the primary MS-PW and the backup MS-PW based on one of the first and second pseudowire status messages,
      cause a switch of the service from the primary MS-PW to the backup MS-PW based on the primary MS-PW being an active path and based on a Signal Degrade condition on the primary MS-PW, and
      cause a switch of the service from the backup MS-PW to the primary MS-PW based on the backup MS-PW being an active path and based on a Signal Degrade condition on the backup MS-PW.

2. The node of claim 1, wherein the controller is further configured to
   provide a trap to any of a management system, an orchestrator, and a Software Defined Networking (SDN) controller based on the determined Signal Degrade condition, wherein the trap indicates one or more segments that have the determined Signal Degrade condition.

3. The node of claim 1, wherein the network is a Multiprotocol Label Switching (MPLS) network and the service is a Layer 2 Virtual Private Network (L2VPN).

4. The node of claim 1, wherein the pseudowire status message is received from associated Switching Provider Edge (SPE) nodes on the primary MS-PW and the backup MS-PW.

5. The node of claim 4, wherein each SPE node is configured to append corresponding Signal Degrade conditions from upstream nodes and to append the Signal Degrade condition on its link and forward to downstream nodes towards the node.

6. The node of claim 4, wherein the pseudowire status message includes a Switching Point Provider Edge (SP-PE) Type-Length-Value (TLV) field with a sub-TLV for conveying the Signal Degrade condition.

7. The node of claim 6, wherein the sub-TLV for conveying the Signal Degrade condition is a type defined for vendor-specific implementation.

8. A method comprising:
   in a node with i) a plurality of ports configured to provide a service over a primary Multi-Segment Pseudowire (MS-PW) and a backup MS-PW in a network and ii) a switching fabric interconnecting the plurality of ports,
   receiving a first pseudowire status message associated with the primary MS-PW and receiving a second pseudowire status message associated with the backup MS-PW;
   determining a Signal Degrade condition on either of the primary MS-PW and the backup MS-PW based on one of the first and second pseudowire status messages;
   causing a switch of the service from the primary MS-PW to the backup MS-PW based on the primary MS-PW being an active path and based on a Signal Degrade condition on the primary MS-PW; and
   causing a switch of the service from the backup MS-PW to the primary MS-PW based on the backup MS-PW being an active path and based on a Signal Degrade condition on the backup MS-PW.

9. The method of claim 8, further comprising
   providing a trap to any of a management system, an orchestrator, and a Software Defined Networking (SDN) controller based on the determined Signal Degrade condition, wherein the trap indicates one or more specific segments that have the determined Signal Degrade condition.

10. The method of claim 8, wherein the network is a Multiprotocol Label Switching (MPLS) network and the service is a Layer 2 Virtual Private Network (L2VPN).

11. The method of claim 8, wherein the pseudowire status message is received from associated Switching Provider Edge (SPE) nodes on the primary MS-PW and the backup MS-PW.

12. The method of claim 11, wherein each SPE node is configured to append corresponding Signal Degrade conditions from upstream nodes and to append the Signal Degrade condition on its link and forward to downstream nodes towards the node.

13. The method of claim 11, wherein the pseudowire status message includes a Switching Point Provider Edge (SP-PE) Type-Length-Value (TLV) field with a sub-TLV for conveying the Signal Degrade condition.

14. The method of claim 13, wherein the sub-TLV for conveying the Signal Degrade condition is a type defined for vendor-specific implementation.

15. A non-transitory computer-readable medium comprising instructions that, when executed, cause a node with i) a plurality of ports configured to provide a service over a primary Multi-Segment Pseudowire (MS-PW) and a backup MS-PW in a network and ii) a switching fabric interconnecting the plurality of ports, to perform the steps of:

responsive to receiving a first pseudowire status message associated with the primary MS-PW and receiving a second pseudowire status message associated with the backup MS-PW, determining a Signal Degrade condition on one of the primary MS-PW and the backup MS-PW based on one of the first and second pseudowire status messages;

causing a switch of the service from the primary MS-PW to the backup MS-PW based on the primary MS-PW being an active path and based on a Signal Degrade condition on the primary MS-PW, and causing a switch of the service from the backup MS-PW to the primary MS-PW based on the backup MS-PW being an active path and based on a Signal Degrade condition on the backup MS-PW.

16. The non-transitory computer-readable medium of claim 15, wherein the instructions that, when executed, further cause the node to perform the step of providing a trap to any of a management system, an orchestrator, and a Software Defined Networking (SDN) controller based on the determined Signal Degrade condition, wherein the trap indicates one or more segments that have the determined Signal Degrade condition.

17. The non-transitory computer-readable medium of claim 15, wherein the network is a Multiprotocol Label Switching (MPLS) network and the service is a Layer 2 Virtual Private Network (L2VPN).

18. The non-transitory computer-readable medium of claim 15, wherein the pseudowire status message is received from associated Switching Provider Edge (SPE) nodes on the primary MS-PW and the backup MS-PW.

19. The non-transitory computer-readable medium of claim 18, wherein each SPE node is configured to append corresponding Signal Degrade conditions from upstream nodes and to append the Signal Degrade condition on its link and forward to downstream nodes towards the node.

20. The non-transitory computer-readable medium of claim 18, wherein the pseudowire status message includes a Switching Point Provider Edge (SP-PE) Type-Length-Value (TLV) field with a sub-TLV for conveying the Signal Degrade condition.

* * * * *